(12) United States Patent
Santelli, Jr.

(10) Patent No.: US 7,075,010 B2
(45) Date of Patent: Jul. 11, 2006

(54) ELECTRICAL CONDUCTOR MANAGEMENT SYSTEM HAVING ELECTROMAGNETIC RADIATION SHIELDING PROPERTIES

(76) Inventor: Albert Santelli, Jr., 58 Hillcrest Rd., Martinsville, NJ (US) 08836

( * ) Notice: Subject to any disclaimer, the term of this patent is extended or adjusted under 35 U.S.C. 154(b) by 0 days.

(21) Appl. No.: 10/692,349

(22) Filed: Oct. 23, 2003

(65) Prior Publication Data

US 2005/0087358 A1    Apr. 28, 2005

(51) Int. Cl.
*H01B 7/00*    (2006.01)

(52) U.S. Cl. ............. 174/72 R; 174/71 R; 174/68.1; 174/34

(58) Field of Classification Search ............. 174/72 R, 174/71 R, 68.1, 34, 72 A, 101
See application file for complete search history.

(56) References Cited

U.S. PATENT DOCUMENTS

| | | | | |
|---|---|---|---|---|
| 5,126,507 A | * | 6/1992 | Kirma | 174/2 |
| 6,084,180 A | * | 7/2000 | DeBartolo et al. | 174/95 |
| 6,143,984 A | * | 11/2000 | Auteri | 174/68.3 |

* cited by examiner

*Primary Examiner*—Jinhee Lee
(74) *Attorney, Agent, or Firm*—Duane Morris LLP

(57) ABSTRACT

A wire management system for mechanically protecting and electromagnetically shielding electrical conductors which extend along exposed surfaces of exterior or interior panels, walls, ceilings, floors of structures located in residential, commercial and industrial environments, may be constructed of one or more inner raceways and an outer raceway for containing the one or more inner raceways. The inner raceways may include a channel member having at least one wall that defines an interior space for receiving at least one electrical conductor, and a cover. A shield for reflecting electromagnetic radiation, may be disposed within the walls of the channel member and the cover.

8 Claims, 5 Drawing Sheets

ELECTRICAL CONDUCTOR MANAGEMENT SYSTEM HAVING ELECTROMAGNETIC RADIATION SHIELDING PROPERTIES

FIELD OF THE INVENTION

The present invention relates to electrical conductor management. More particularly, the present invention relates to an electrical conductor management system having electromagnetic radiation shielding properties.

BACKGROUND OF THE INVENTION

Electrical conductors, such as telephone lines, data cables, and power cables, to name a few (wires hereinafter), which extend along exposed surfaces of exterior or interior panels, walls, ceilings, and floors of structures located in residential, commercial, and industrial environments, are typically contained in various types of enclosures. The enclosures manage, mechanically protect, and in some applications, shield the wires from electromagnetic radiation.

In applications where the wires require electromagnetic shielding, the enclosures are often formed as metal conduits. Metal conduits provide excellent mechanical protection and electromagnetic shielding for wires, but are expensive and heavy. Additionally, metal conduits are inconvenient to use for many reasons. For example, metal conduits are electrically conductive and, therefore, often requiring grounding. Also, the wires to be contained therein must be drawn through the conduit during installation.

A more desirable method for enclosing wires, is to use molded or extruded plastic enclosures, such as raceways and ducts. Such enclosures provide good mechanical protection for the wires, are relatively inexpensive, and low in weight. Moreover, many molded and extruded plastic wire enclosure designs are more convenient to use than metal conduits, because the wires can be laid into the enclosure instead of being drawn through during installation.

One problem associated with conventional molded and extruded plastic wire enclosures is that they allow electromagnetic radiation to enter into and/or radiate from the enclosure. If this should be undesirable, the wires must include some type of shielding or separate electrically conductive shields must be installed in the enclosure. In either case, the cost of the wire management system increases dramatically.

Accordingly, an electrical conductor management system is needed that has electromagnetic shielding properties and other improvements.

SUMMARY OF THE INVENTION

A wire management system comprising an outer raceway and at least one inner raceway. In one aspect of the invention, the outer raceway comprises a first channel member defining an interior space and a first cover for blocking access to the interior space of the first channel member. The inner raceway comprises a second channel member defining an interior space, a second cover for blocking access to the interior space of the second channel member, and a shield disposed within the walls of the second channel member and the second cover, for reflecting electromagnetic radiation.

A wire management system according to another aspect of the invention comprises an outer raceway and inner raceway, the outer raceway including a first channel member defining an interior space and a first cover for blocking access to the interior space of the first channel member. The inner raceway comprises a second channel member defining an interior space and a second cover for blocking access to the interior space of the second channel member. The second channel member includes two laterally extending flanges which cooperate with projections on an inner surface of the channel member to retain the inner raceway within the interior of space of the outer raceway.

A wire management system according to a further aspect of the invention comprises a channel member defining an interior space, a cover for blocking access to the interior space of the channel member, and a shield disposed within the walls of the channel member and the cover, for reflecting electromagnetic radiation.

BRIEF DESCRIPTION OF THE DRAWINGS

The advantages, nature, and various additional features of the invention will appear more fully upon consideration of the illustrative embodiments now to be described in detail in connection with accompanying drawings where like numerals identify like elements and wherein.

DETAILED DESCRIPTION OF THE INVENTION

The present invention is an electrical conductor (wire) management system having electromagnetic radiation shielding properties. The wire management system of the present invention is generally intended, without limitation, for managing, routing, and mechanically protecting electrical conductors (wires), such as telephone lines, data cables, power cables, and the like, which extend along surfaces of exterior or interior panels, walls, ceilings, floors of structures located in residential, commercial and industrial environments, electrical cabinets, and panels for equipment. The wire management system is particularly useful for managing and routing power and data cables in the same raceway.

Figure 1A:
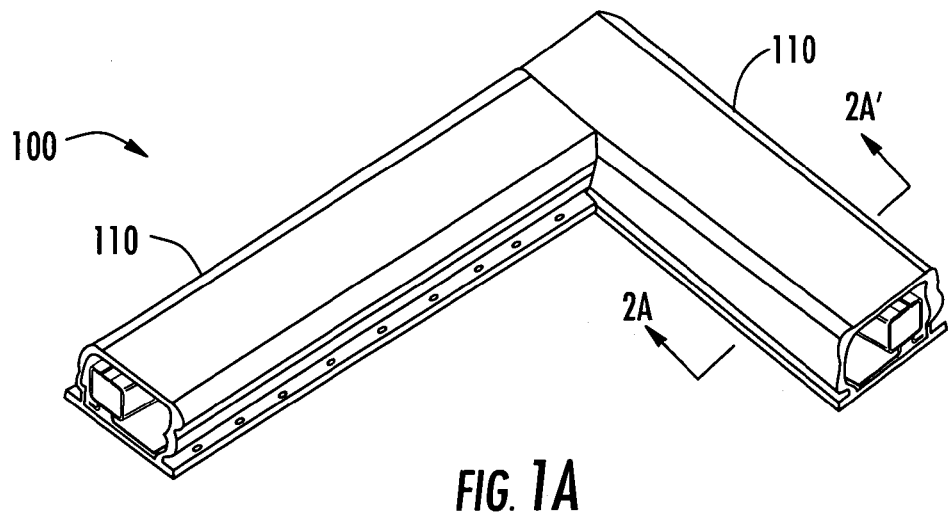
FIGS. 1A–1C illustrate a wire management system of the present invention and a few illustrative methods for joining raceway sections of the system together.
Figure 1B:
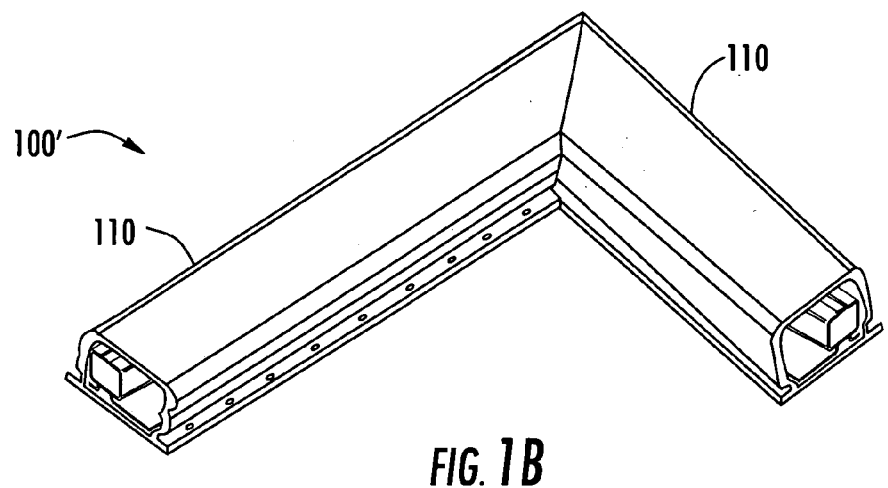
Figure 1C:
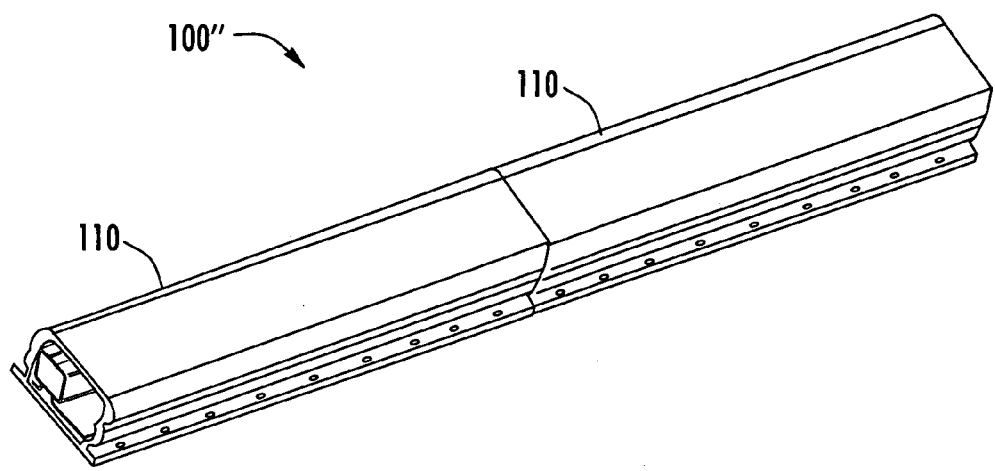

FIGS. 1A–1C collectively illustrate a wire management system of the present invention denoted by numeral 100. The wire management system 100 may include one or more raceway sections 110, which may be joined or spliced together as shown in the embodiment of FIG. 1A so as to define a continuous conduit or duct. The joint or splice may then be wrapped with metalized tape (not shown) to seal the interior of the system 100 from the external environment. The ends of the raceway sections 110 may also be joined together as shown in the embodiment of FIG. 1B, with a mitred joint, or as shown in the embodiment of FIG. 1C, without a mitred joint. The joints shown in FIGS. 1B and 1C may then be wrapped with metalized tape (not shown) to seal the interior of the systems 100 from the external environment. The raceway sections 110 may be formed or cut to any desired length, and connected and arranged in an almost unlimited variety of configurations and angles to meet the managing and routing requirements of a particular the application or installation.

Figure 2A:
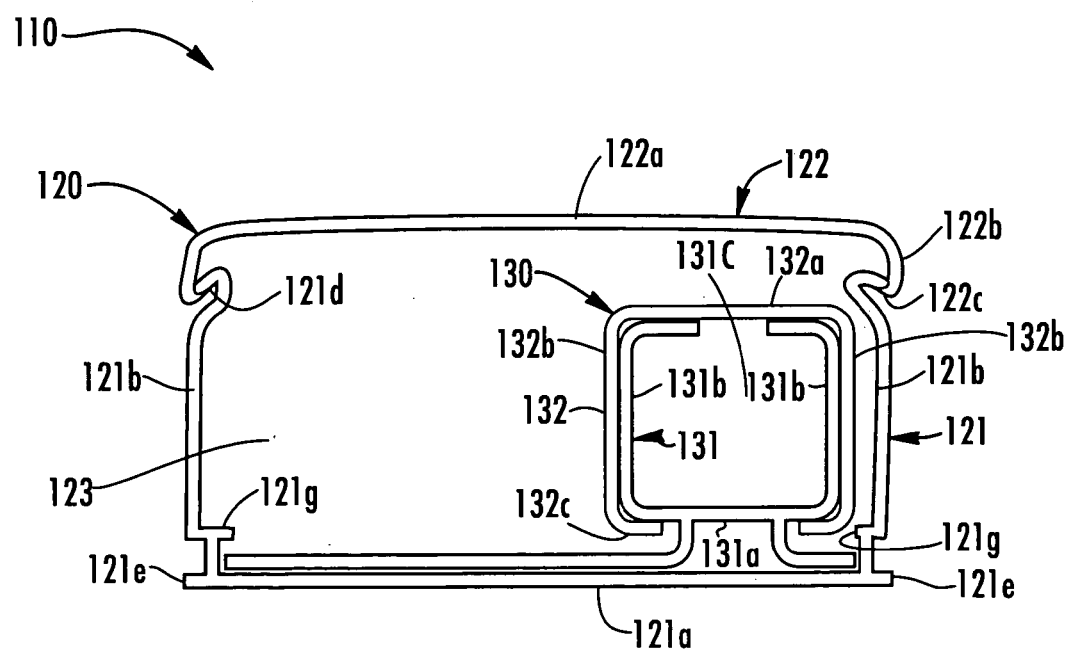
FIG. 2A is a cross-sectional view of a raceway section comprising outer and inner raceways made according to an embodiment the invention.
Figure 2B:
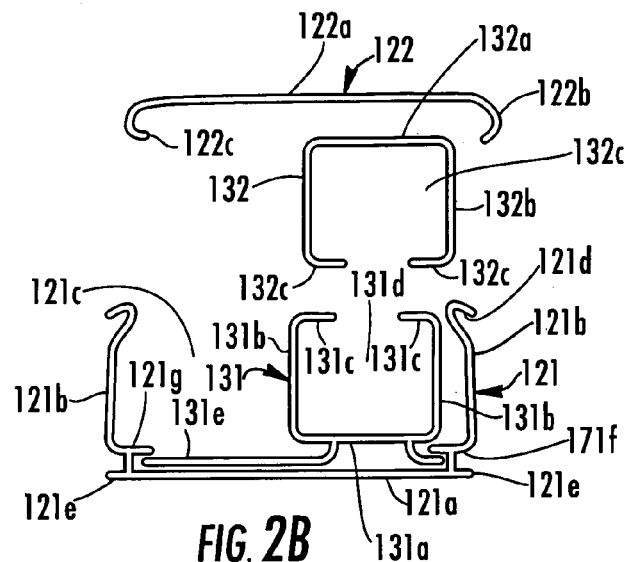
FIG. 2B is a partially exploded, cross-sectional view of the raceway section of FIG. 2B.
Figure 3A:
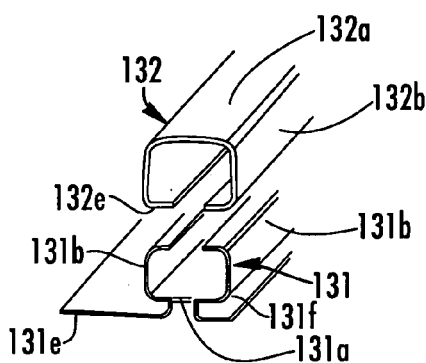
FIG. 3A is a perspective view of a section of the inner raceway of FIGS. 2A and 2B.
Figure 3B:
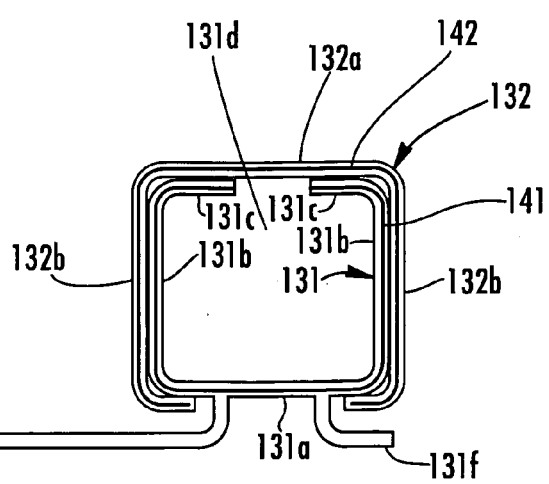
FIG. 3B is a cross-sectional view of the inner raceway of FIG. 3A.

Referring collectively to FIGS. 2A and 2B, the raceway section 110 may include, in one embodiment of the present invention, an outer raceway 120, and an inner raceway 130 removably contained within an interior space 121c of the outer raceway 120. The inner raceway 130 may be used for routing one or more telephone lines, data cables, power cables, and like electrical wires. The portion of the interior space 121c not occupied by the inner raceway 130 may also be used for routing one or more additional telephone lines, data cables, power cables, and like electrical wires.

Still referring to FIGS. 2A and 2B, the outer raceway 120 may be formed by a channel member 121 and a detachable cover 122 which is coextensive with the channel member 121 and blocks access to the interior space 121c of the outer raceway 120. The channel member 121 may have a rectangular configuration including a bottom wall 121a and opposing side walls 121b extending up from lateral edges of the bottom wall 121a, which together define the interior space 121c of the outer raceway 120. The channel member 121 may be sized such that the interior space 121c thereof can contain the inner raceway 130 and wires W or a second inner raceway (not shown). The detachable cover 122 may include a substantially planar top wall 122a and opposing side walls 122b depending from lateral edges of the top wall 122a. A snap-fastening arrangement may be used for snap-fastening the cover 122 to the channel member 121. The snap-fastening arrangement may include inwardly extending projections 122c formed on opposing lateral edges of the cover side walls 122b, and outwardly facing grooves 121d formed at the top of the opposing channel member side walls 121b for receiving the projections 122c. Although not shown in the drawings, one of ordinary skill in the art will appreciate that one side of the cover 122 may also be hinged to the channel member 121 via a conventional unitarily formed living hinge or separate hinge element.

The detachable (or hinged) cover 122, when removed (or opened in the case of a hinged cover), provides easy access to the interior space 121c of the channel member 121 at any time for various purposes, for example, to lay wire therein and/or in the inner raceway 130, or to install or remove the inner raceway 130.

The channel member 121 may also include mounting means for allowing the outer raceway 120 to be mounted to the surface of a wall, ceiling, floor or the like. In the shown embodiment, the mounting means includes a flange 121e extending laterally from the bottom wall 121a on each side of the channel member 121. One or both of the flanges 121e may be provided with apertures (not visible) for receiving a fastener, such as a screw or nail, that retains the outer raceway 120 to the surface of a panel, wall, ceiling, or floor. The mounting means may also include an adhesive or bonding arrangement, such as double sided tape, applied to the outer surface of the bottom wall 121a and/or flanges 121e.

The cover 122 and channel member 121 of the outer raceway 120 may be fabricated from any plastic composition suitable for wire raceways, using any well known plastic forming method, such as extrusion.

Referring collectively to FIGS. 2A, 2B, 3A and 3B, the inner raceway 130 may be formed by a channel member 131 and a snap-on, channel-like cover 132 which is coextensive with the channel member 131. The channel member 131 may have a rectangular configuration including a bottom wall 131a and opposing side walls 131b extending up from lateral edges of the bottom wall 131a, which together define an interior space 131d for receiving the earlier mentioned wires. The terminal ends 131c of the side walls 131b turn inwardly to define an opening therein into the interior space 131d. The snap-on, channel-like cover 132 may include a substantially planar top wall 132a and opposing side walls 132b depending from lateral edges of the top wall 132a. The terminal ends 132c of the side walls 132b turn inwardly to define an interior space 132d that receives the channel member 131.

When the cover 132 is applied to the channel member 131, the cover side walls 132b spread apart around the channel member side walls 131b and then resiliently snap back such that the inwardly turned terminal ends 132c of the cover side walls 132 snap under the channel member bottom wall 131a, thereby retaining the cover 132 to the channel member 131. The cover 132 may be removed by spreading the cover side walls 132b apart and pulling the cover 132 up off the channel member 131. The snap-on cover 132 provides easy access to the interior space 131c of the inner raceway channel member 131 at any time for various purposes, for example, to lay wire therein.

In accordance with the electromagnetic radiation shielding aspects of the present invention, the wire management system 100 may be provided with electromagnetic radiation shielding properties via a shield formed by one or more reflective shield sections 141 and 142 disposed respectively within the walls 131a, 131b, 132a, 132b of the inner raceway 130. In the shown embodiment, the shields 141 and 142 may be formed from thin sheets of metallic material. In one embodiment of the invention, the shields 141 and 142 comprise thin sheets of aluminum, which may have a thickness of about 0.0003 inches.

In accordance with another aspect of the present invention, the inner raceway channel member 131 may also include a wide flange 131e extending laterally from the bottom wall 131a thereof, and a narrow flange 131f extending laterally from the bottom wall 131a thereof, in a direction opposite to the wide flange 131e. The terminal edges of the wide and narrow flanges 131e, 131f resiliently snap under inwardly directly projections 121g formed on the inner surfaces of the channel member side walls 121b of the outer raceway 120, to securely retain the inner raceway 130 within the interior space 121c of the outer raceway 120.

The channel member 131 and cover 132 of the inner raceway 130 may be extruded from any plastic composition suitable for wire raceways. The walls 131a, 131b, 132a, 132b of the channel member 131 and cover 132 may be extruded around their respective shields 141 and 142, which may be formed in the shape (and size) of their respective channel member 131 and cover 132, thereby laminating the shields 141 and 142 with plastic. Each of the shields 141 and 142 may be formed as a single unitary member or formed from a plurality of sections.

As described earlier, the shields 141 and 142 disposed in the walls of the channel member 131 and cover 132 reflect electromagnetic radiation. Consequently, externally originating electromagnetic radiation may be substantially prevented from entering the interior space 131c of the inner raceway 130 and being transmitted by the one or more wires routed therein. Further, electromagnetic radiation generated by the one or more wire(s) routed in the inner raceway 130 may be reflected back into the interior space 131c thereof, and therefore, substantially prevented from being emitted therefrom and interfering with the one or more wires routed in the interior space 121c of the outer raceway not occupied by the inner raceway, and/or various electronic devices external to the outer raceway. Accordingly, the wire management system 100 of the present invention reduces the need for conventional electromagnetic shielding jacketed around the wires themselves.

Generally, the shields 141 and 142 in the walls of the channel member 131 and the cover 132 may overlap one another when the cover 132 is installed on the channel member 131, thus preventing electromagnetic radiation leakage into or out of the inner raceway 130. However, due to manufacturing tolerances and/or design issues, there may instances when the shields 141 and 142 do not overlap one another, or when a gap exists between the shields 141 and 142 of the channel member 131 and the cover 132. In such instances, a ferrite containing gasket (not shown) may be employed between the cover 132 and the channel member 131 to prevent electromagnetic radiation leakage into and out of the inner raceway 130.

Figure 4:
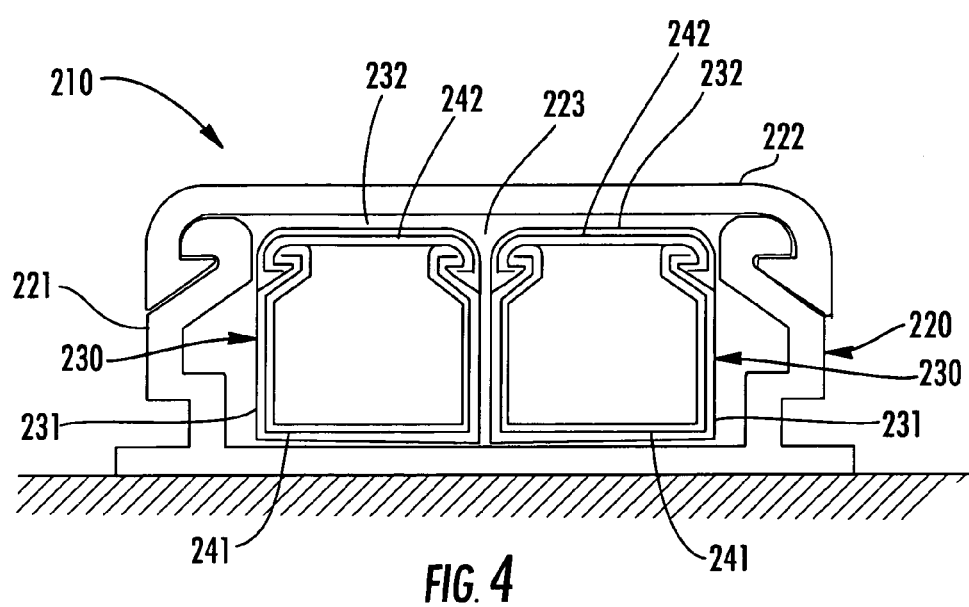
FIG. 4 is a cross-sectional view of a raceway section made according to another embodiment the invention.

FIG. 4 illustrates another embodiment of a raceway section of the wire management system of the present invention, denoted by numeral 210. The raceway section 210 may include an outer raceway 220 and two inner raceways 230 removably contained within an interior space 223 of the outer raceway 220. The outer raceway 220 may include a channel member 221 and a detachable cover 222, which are similar to the channel member 121 and detachable cover 122 of the outer raceway 120 of FIGS. 2A and 2B, except that outer raceway 220 may optionally omit the inwardly directly projections formed on the inner surfaces of the channel member side walls. The inner raceways 230 may each include a channel member 231, a detachable cover 232 similar to the covers 122 and 222 of the outer raceways 120 and 220, and reflective shields 241 and 242 disposed respectively within the walls of the channel member 232 and cover 232 for reflecting electromagnetic radiation. The wide and narrow flanges used on the inner raceway 130 of the previous embodiment may be omitted as shown in this embodiment.

Although not shown, the outer raceway can be sized to contain any desired number of inner raceways, where one or more of the inner raceways may have shields disposed within the walls thereof for shielding electromagnetic radiation.

Figure 5:
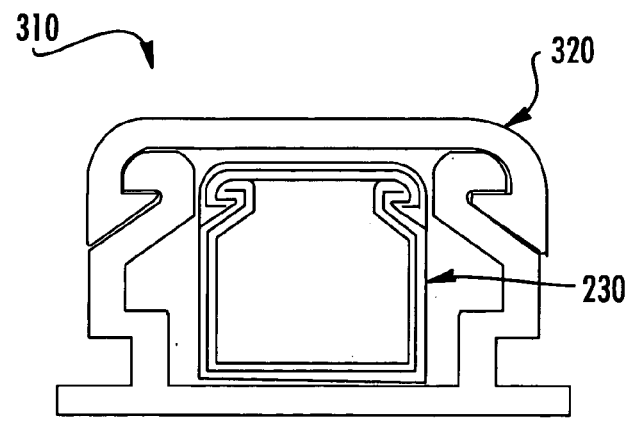
FIG. 5 is a cross-sectional view of a raceway section made according to a further embodiment the invention.

FIG. 5 illustrates still another embodiment of a raceway section of the wire management system of the present invention, denoted by numeral 310. The raceway section 310 is substantially identical to the raceway section 210 of FIG. 4, except that it includes an outer raceway 320 that may be sized to contain only a single inner raceway 230.

It is contemplated that any one of the electromagnetic shielding inner raceways described above may be used alone, without the outer raceway. In consideration of such an application, the wide and/or narrow flanges of the inner raceway 130 shown in FIGS. 3A and 3B may be provided with apertures (not shown) for receiving fasteners that retain the inner raceway to the surface of a panel, wall, ceiling, or floor. An adhesive or bonding arrangement, such as double sided tape, applied to the outer surface of the bottom wall of the inner raceway and/or flanges, may also be used to fasten the inner raceway 130 to the surface of a panel, wall, ceiling, or floor, in applications where the inner raceway is used alone without the outer raceway.

Figure 6:
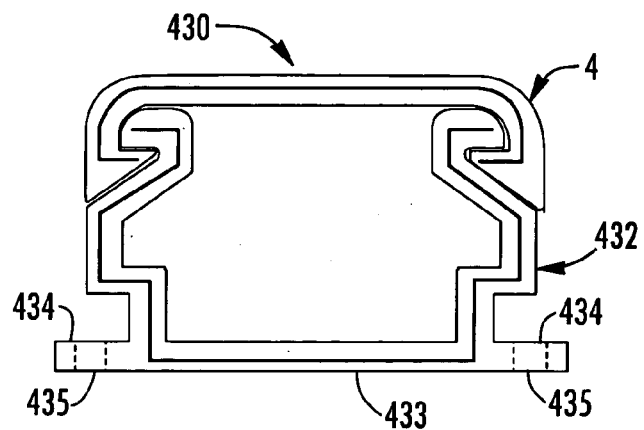
FIG. 6 is a cross-sectional view of an inner raceway made according to another embodiment of the present invention.

Similarly, the inner raceway of FIGS. 4 and 5, may be modified to be used alone, without the outer raceway, as shown in FIG. 6. As can be seen, the modified inner raceway 430 includes a flange 434 that extends laterally from the bottom wall 433 on one or each side of the channel member 432. The flange or flanges 434 may include apertures 435 for receiving fasteners (not shown) that retain the inner raceway 430 to the surface of a panel, wall, ceiling, or floor. An adhesive or bonding arrangement, such as double sided tape, applied to the outer surface of the bottom wall 433 of the inner raceway and/or flanges 434, may also be used to fasten the inner raceway 430 to the surface of a panel, wall, ceiling, or floor.

Figure 7:
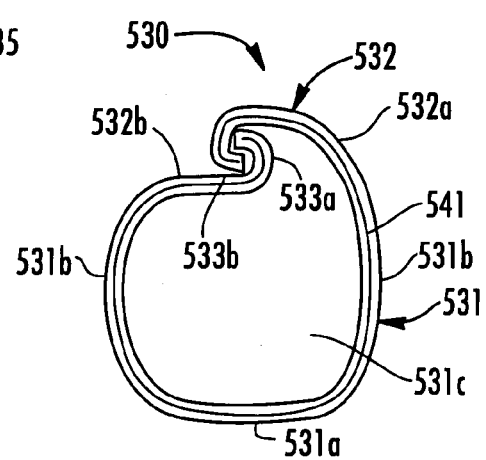
FIG. 7 is a cross-sectional view of an inner raceway made according to still another embodiment of the present invention.

FIG. 7 is another embodiment of the inner raceway, denoted by numeral 530. The inner raceway 530 may be a single unitary unit including a channel member 531 and a split cover 532 formed by upper and lower cover portions 532a and 532b respectively, which extend from side walls 531b of the channel member 531. The walls of the channel member and the cover 532 elastically bend or flex to allow the cover portions 532a and 532b to be brought together to block access to the interior 531c of the channel member 531. The edges of the upper and lower cover portions 532a and 532b may include complementary snap fastening hook members 533a and 533b respectively, which cooperate with one another to retain the upper and lower cover portions 532a and 532b together. A reflective shield 541, for reflecting electromagnetic radiation, may be disposed within the bottom, side, and cover portion walls 531a, 531b, 532a, and 532b of the inner raceway 530. The inner raceway can be used alone or placed within any of the outer raceways disclosed herein.

While the foregoing invention has been described with reference to the above embodiments, various modifications and changes can be made without departing from the spirit of the invention. Accordingly, such modifications and changes are considered to be within the scope of the appended claims.

What is claimed is:

1. A wire management system comprising:
   an outer raceway comprising:
      a first channel member defining an interior space;
      a first cover for blocking access to the interior space of the first channel member;
   at least one inner raceway contained entirely within the outer raceway, the at least one inner raceway comprising:
      a second channel member having at least one wall defining an interior space;
      a second cover having at least one wall, the second cover for blocking access to the interior space of the second channel member;
      a shield disposed within the at least one walls of the second channel member and the second cover, the shield for reflecting electromagnetic radiation, the shield not being exposed to the interior space defined by the second channel member.

2. The wire management system according to claim 1, wherein the channel members and covers are formed from a plastic material.

3. The wire management system according to claim 2, wherein the shield is formed from a sheet of metallic material.

4. The wire management system according to claim 1, wherein the shield is formed from a sheet of metallic material.

5. The wire management system according to claim 1, wherein the second cover comprises a detachable cover.

6. The wire management system according to claim 5, further comprising a snap fastening arrangement for retaining the detachable cover to the channel member.

7. The wire management system according to claim 5, wherein the shield includes a first section disposed within the at least one wall of the second channel member, and a second section disposed within the at least one wall of the second cover.

8. The wire management system according to claim 1, further comprising means for fastening the first channel member to a support surface.

* * * * *